(12) United States Patent
West (10) Patent No.: US 11,365,043 B2
(45) Date of Patent: Jun. 21, 2022

(54) FLUID DISPENSING SYSTEM

(71) Applicant: Rennie West, Carson, CA (US)

(72) Inventor: Rennie West, Carson, CA (US)

( * ) Notice: Subject to any disclaimer, the term of this patent is extended or adjusted under 35 U.S.C. 154(b) by 0 days.

(21) Appl. No.: 17/192,113

(22) Filed: Mar. 4, 2021

(65) Prior Publication Data

US 2021/0276790 A1 Sep. 9, 2021

Related U.S. Application Data

(60) Provisional application No. 62/984,836, filed on Mar. 4, 2020.

(51) Int. Cl.
*B65D 83/00* (2006.01)
*B05B 11/00* (2006.01)

(52) U.S. Cl.
CPC ..... *B65D 83/0033* (2013.01); *B65D 83/0044* (2013.01); *B05B 11/0089* (2013.01); *B05B 11/3008* (2013.01)

(58) Field of Classification Search
CPC ............ B65D 83/0033; B65D 83/0044; B65D 2231/005; B05B 11/0089; B05B 11/3008; G01F 11/025; B65B 1/48; B65B 69/00; B65B 3/12; A47K 5/12
See application file for complete search history.

(56) References Cited

U.S. PATENT DOCUMENTS

| | | | |
|---|---|---|---|
| 1,458,282 A * | 6/1923 | Fairbanks | ................. B65B 3/12 222/49 |
| 2,689,671 A | 9/1954 | George et al. | |
| 2,787,268 A | 4/1957 | Irving | |
| 4,205,766 A * | 6/1980 | White | ................. B65D 83/0005 222/320 |
| 4,469,153 A * | 9/1984 | Morrisette | .......... B01F 35/7174 92/255 |
| 4,630,759 A | 12/1986 | Dawn | |
| 4,676,655 A * | 6/1987 | Handler | .............. B01F 35/7161 222/386 |
| 5,318,204 A | 6/1994 | Davis et al. | |

(Continued)

FOREIGN PATENT DOCUMENTS

EP 0027732 B1 2/1986
KR 101389530 B1 * 5/2014

*Primary Examiner* — Vishal Pancholi
*Assistant Examiner* — Bob Zadeh
(74) *Attorney, Agent, or Firm* — Argus Intellectual Enterprise; Jordan Sworen; Daniel Enea (57) ABSTRACT

A fluid dispensing system is provided. The fluid dispensing system includes a container formed by a first chamber and a second chamber separated by an internal divider. A stopper element extends through each chamber via a first aperture disposed in the internal divider. A second aperture is disposed in a base of the second chamber, wherein the stopper element is used to selectively allow fluid to flow from the first chamber into the second chamber when the stopper element is in a measuring configuration. When the stopper element is in a dispensing configuration, the first aperture between is closed and the second aperture is opened to allow fluid from the second chamber to flow exterior from the container. In this manner, a measured amount of fluid from the container can be dispensed in a single movement without using a secondary measuring receptacle.

20 Claims, 12 Drawing Sheets

(56) References Cited

U.S. PATENT DOCUMENTS

| | | | |
|---|---|---|---|
| 5,829,875 A * | 11/1998 | Hagel | B65D 83/0005 |
| | | | 222/386 |
| 5,967,377 A | 10/1999 | Glynn | |
| 6,443,331 B1 | 9/2002 | DeJonge | |
| 7,866,465 B2 | 1/2011 | Dverin | |
| 8,079,388 B2 | 12/2011 | Turgeman | |
| 8,128,591 B2 * | 3/2012 | Simonton | B01F 35/7161 |
| | | | 604/82 |
| 8,556,131 B2 | 10/2013 | Decottignies et al. | |
| 2002/0074367 A1 | 6/2002 | Kawakita | |
| 2013/0037427 A1 * | 2/2013 | Wu | B65D 51/002 |
| | | | 206/222 |
| 2015/0102068 A1 * | 4/2015 | Wegener | G01F 11/028 |
| | | | 222/158 |
| 2021/0276790 A1 * | 9/2021 | West | G01F 11/025 |

\* cited by examiner

FLUID DISPENSING SYSTEM

BACKGROUND OF THE INVENTION

The present invention relates to dispensing devices and vessels for supporting and dispensing fluid. More specifically, the present invention relates to a container with a dual chambered construction and a stopper element extending therethrough to operably allow fluid to move between the chambers and dispense from the container.

When using fluids for cleaning, cooking, and laundering clothes the fluids must be measured before final use. For example, fluid bleach is used for many different applications which require a specific amount of bleach depending on what is being cleaned or how much is being cleaned. Therefore, before the bleach can be used, a person must measure the exact amount needed in order to avoid using too much, such that clothing or surfaces are not damaged, or too little, such that bacteria and other grime remain unaffected during cleaning. As a solution, a person will first pour the fluid into a secondary measuring cup and then add the measured amount to another container. However, the additional step of measuring can cause the fluids to spill on surfaces and the person, releasing toxic chemicals into the environment and cause the person to come into direct contact with such chemicals.

Furthermore, as fluid containers begin to empty, it becomes increasingly more difficult to remove the last remaining fluid therefrom. As a result, people end up maneuvering the container to retrieve the last amount of fluid by tipping the container or leaving the container in an upside-down manner to allow the fluid to accumulate at the release knob side opening. Manipulating the containers in such a manner is frustrating, inefficient, and can lead to spillage. Therefore, there exists a need for a fluid dispensing system that allows a user to measure the exact amount of fluid needed without having to use a secondary measuring device and allowing the fluid to dispense from a convenient area of the container without risking excess spillage.

In light of the devices disclosed in the known art, it is submitted that the present invention substantially diverges in design elements and methods from the known art and consequently it is clear that there is a need in the art for an improvement for a fluid dispensing system. In this regard the instant invention substantially fulfills these needs.

SUMMARY OF THE INVENTION

In view of the foregoing disadvantages inherent in the known types of fluid dispensing systems now present in the known art, the present invention provides a new fluid dispensing system wherein the same can be utilized for measuring an exact amount of fluid and releasing the measured fluid from a container in a single movement.

It is an objective of the present invention to provide a fluid dispensing system comprising a container having a first chamber and a second chamber, wherein both the first chamber of the container and the second chamber are configured to hold fluid therein. An internal divider separates the first chamber from the second chamber, wherein a first aperture is disposed within the internal divider that allows fluid to flow from the first chamber to the second chamber. A second aperture is disposed in the second chamber that allows fluid to dispense from the container.

It is another objective of the present invention to provide a fluid dispensing system comprising a stopper element movable between a measuring configuration and a dispensing configuration, wherein the measuring configuration fluid flows from the first chamber to the second chamber and in the dispensing configuration the fluid is dispensed from the container.

It is another objective of the present invention to provide a fluid dispensing system configured to dispense a pre-measured amount of fluid from the container to prevent the use of a secondary measuring receptacle.

It is therefore an object of the present invention to provide a new and improved fluid dispensing system that has all of the advantages of the known art and none of the disadvantages.

Other objects, features, and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings.

DETAILED DESCRIPTION OF THE INVENTION

Reference is made herein to the attached drawings. For the purposes of presenting a brief and clear description of the present invention, the preferred embodiment will be discussed as used for dispensing a measured amount of fluid from a second chamber of a container. The figures are intended for representative purposes only and should not be considered to be limiting in any respect.

Figure 1:
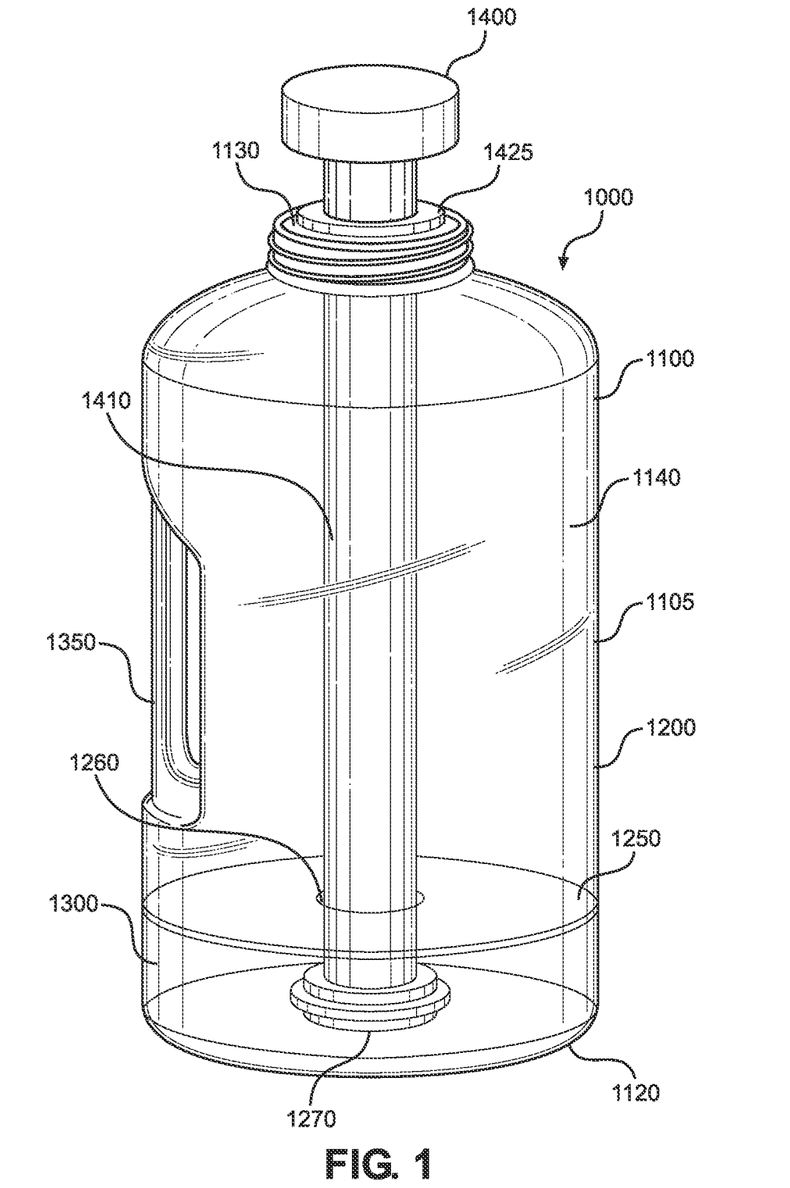
FIG. 1 shows a perspective view of a first embodiment of the fluid dispensing system.

Referring now to FIG. 1, there is shown a perspective view of a first embodiment of the fluid dispensing system. In the illustrated embodiment, the fluid dispensing system 1000 comprises a container 1100 having a sidewall 1110, a base 1120, and an opening 1130 adapted to receive fluid therethrough. The container 1100 comprises an interior volume 1140 separated into a first chamber 1200 and a second chamber 1300. In the illustrated embodiment, the second chamber 1300 is configured to be a specific known volumetric measurement, such as an increment or a whole value of a cup measurement. In alternate embodiments, the second chamber 1300 comprises indicia along the sidewall to indicate to a user an exact volumetric measurement, such as incremental values of a cup measurement. In the illustrated embodiment, the first chamber 1200 comprises a larger interior volume than the second chamber 1300 because the first chamber is used to store the fluid and incrementally dispense the stored fluid into the second chamber on a per use or single use basis. The container 1100 is composed of any suitable material configured to retain liquid therein, such as glass or plastic. In the illustrated embodiment, the container 1100 comprises a circular cross section. However, in alternate embodiments, the container comprises any suitable shape.

In some embodiments, the container 1100 comprises a handle 1350 for convenient handling and movement thereof. In the illustrated embodiment, the handle 1350 expends along the sidewall 1105 and includes a hand-hold aperture for receiving a hand therethrough.

The first chamber 1200 and the second chamber are separated by an internal divider 1250, wherein the internal divider 1250 is disposed within the interior volume 1140 of the container 1100. In the illustrated embodiment, the first chamber 1200 is disposed entirely above the second chamber 1300 and separated only by the internal divider 1250. A sidewall 1105 of the container 1100 serves as the sidewall 1105 for both chambers. In the illustrated embodiment, the opening 1130 of the container is disposed at a top thereof to allow the container to be refilled as desired. The fluid is poured directly into the first chamber 1200 from the opening 1130.

In the illustrated embodiment, the internal divider 1250 comprises a circular cross section to correspond with the shape of the container 1100. The internal divider 1250 is coextensive with the sidewall 1105 of the container 1100 to prevent fluid from passing therebetween. A first aperture 1260 is disposed through the internal divider 1250 and allows fluid to pass between the first chamber 1200 to the second chamber 1300. A second aperture 1270 is disposed in a wall of the second chamber 1300 and allows fluid to dispense from the second chamber 1300 to an exterior of the container 1100. In the illustrated embodiment, only a single aperture is disposed on the internal divider and on a wall of the second chamber. However, in alternate embodiments, more than one aperture is contemplated in the internal divider and wall of the second chamber. In the illustrated embodiment, the second aperture 1270 is disposed centrally on the base 1120 of the container 1100 which also serves as the base of the second chamber 1300 and is the lowermost dispensing aperture. The first aperture 1260 is aligned directly above the second aperture 1270 to cooperatively receive a stopper element 1400 that is configured to selectively engage each aperture 1260, 1270 to prevent or allow fluid to flow therefrom.

Figure 2:
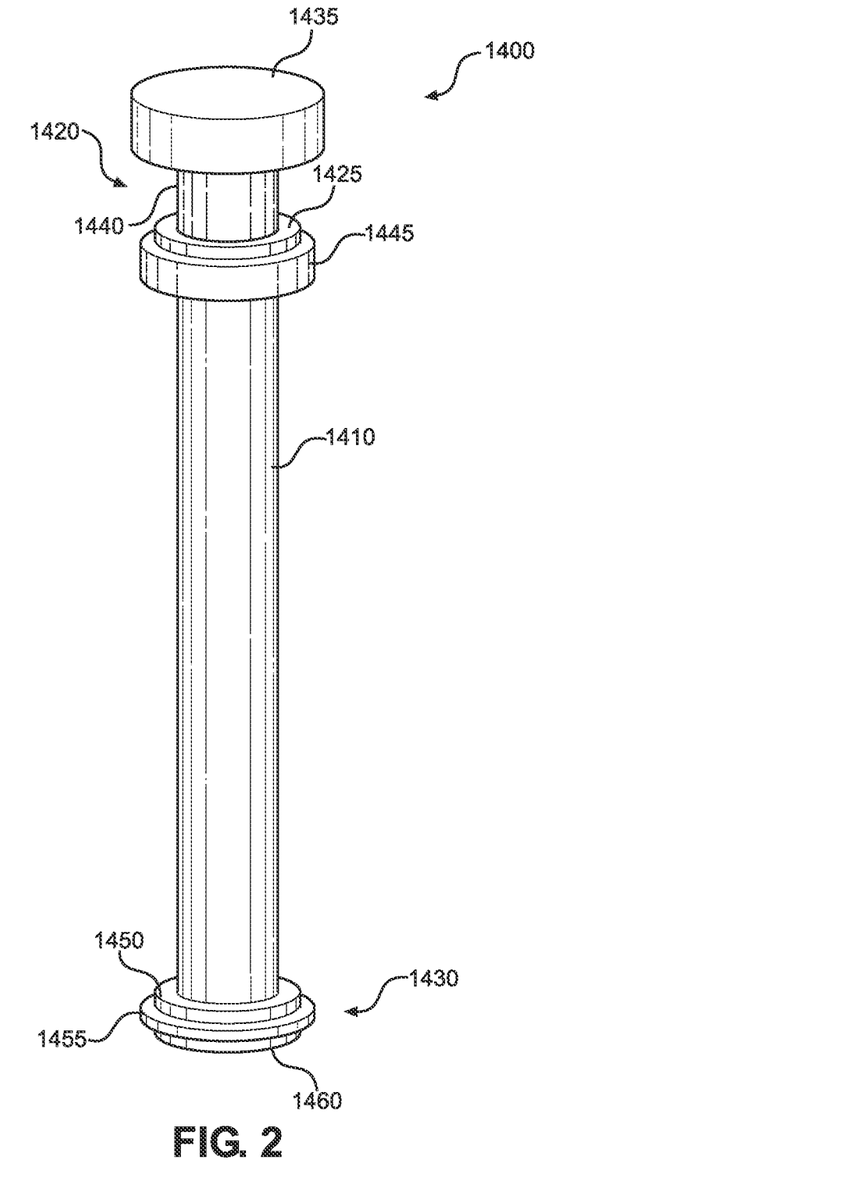
FIG. 2 shows a perspective view a stopper element of the fluid dispensing system.

Referring now to FIGS. 1 and 2, there is shown the perspective view of a first embodiment of the fluid dispensing system and a perspective view a stopper element of the fluid dispensing system, respectively. The stopper element 1400 is configured to extend through the container 1100 and allow fluid to selectively pass from the first chamber 1200, to the second chamber 1300, and to the exterior of the container. The stopper element 1400 comprises a shaft 1410 having a first end 1420 and an opposing second end 1430. The first end 1420 comprises a first gasket seal 1425 disposed therearound and is adapted to operably seal the opening 1130 of the container 1100 when moved within the opening 1130. The diameter of the first gasket seal 1435 is sized to frictionally engage with the opening of the container 1100. A first seat 1445 having a larger diameter than the opening 1130 and the first gasket seal 1425 is disposed therebeneath around the shaft 1410 and is configured to prevent the shaft 1410 from being removed from the container 1100. In some embodiments, the first gasket seal 1425 is slidable along the shaft 1410 to allow the opening 1130 to remain sealed when the shaft 1410 is moving.

In the illustrated embodiment, a release knob 1435 is disposed above the first gasket seal 1425, whereby a shaft section 1440 positioned between the release knob and the first gasket seal is exterior to the container 1100 when the opening is sealed. The release knob 1435 extends above the opening 1130 of the container 1100 and allows the user to control the position of the shaft 1410 within the interior volume 1140 of the container 1100. In the illustrated embodiment, the release knob 1435 comprises a circular shaped cross section and comprises a threaded interior sidewall. In some embodiments, the shaft section 1440 is telescopic, or spring loaded, wherein the release knob 1435 is pushed downwards the shaft section 1440 collapses and the release knob 1435 is rotated to threadedly secure to the threads disposed around the opening 1130 of the container 1100.

The second end 1430 of the shaft 1410 comprises a plug having a second gasket seal 1450, a third gasket seal 1460, and a second seat 1455 positioned therebetween. The diameters of the second and third gasket seals 1450, 1460 are sized to frictionally engage with the first and second apertures 1260, 1270 of the container 1100, respectively, and prevent fluid from passing therethrough when operatively engaged or plugging the respective aperture. The second seat 1445 comprises a larger diameter than the both the first and second apertures 1260, 1270 and is configured to prevent the shaft 1410 from being removed through either the first or second apertures of the container 1100. In the illustrated embodiment, the second and third gasket seals 1450, 1460 are disposed at the lowermost end of the shaft 1410. This configuration prevents any excess portion of the shaft from extending through the second aperture, thereby allowing the container 1100 to remain flat or unobstructed when positioned on a surface.

Figure 3:
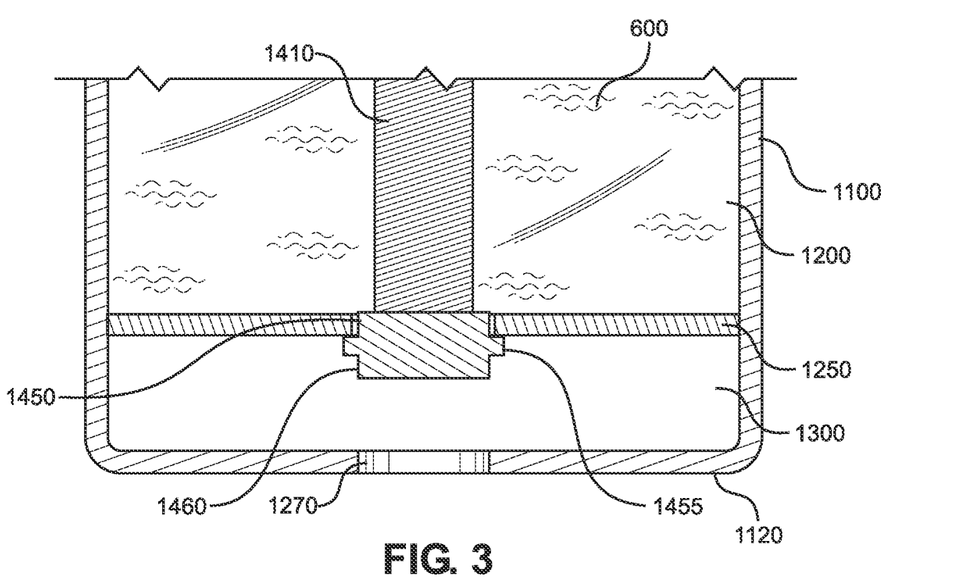
FIG. 3 shows a cross sectional view of the second chamber of a first embodiment of the fluid dispensing system, wherein the stopper element is in a dispensing configuration.
Figure 4:
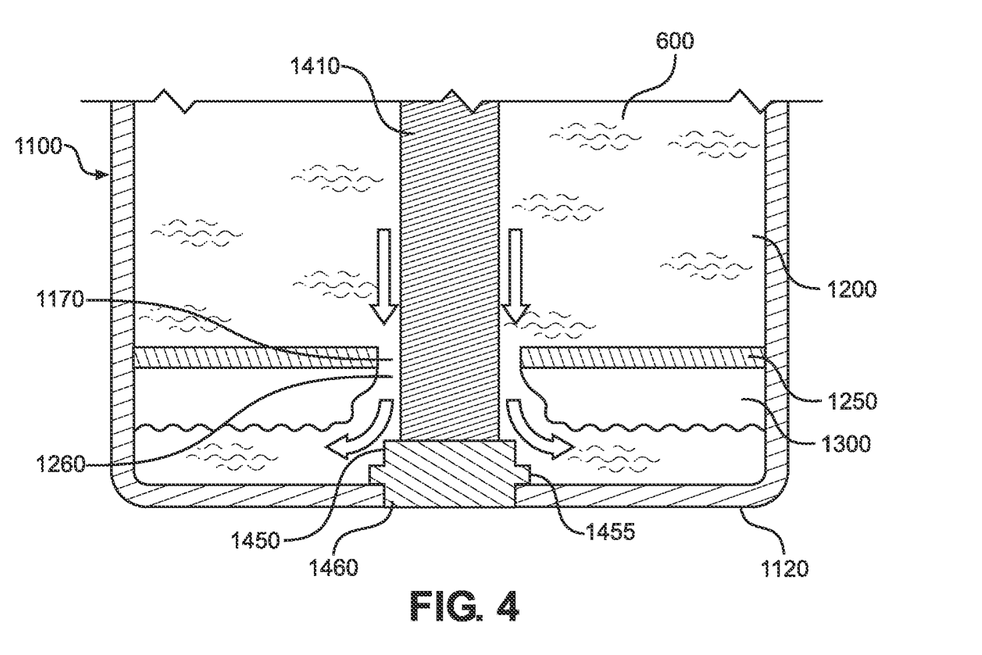
FIG. 4 shows a cross sectional view of the second chamber of a first embodiment of the fluid dispensing system, wherein the stopper element is in a measuring configuration.

Referring now to FIGS. 3 and 4, there is shown a cross sectional view of the second chamber of a first embodiment of the fluid dispensing system, wherein the stopper element is in a measuring configuration and a dispensing configuration, respectively. The stopper element 1400 is movable between a measuring configuration and a dispensing configuration. In the measuring configuration, the second aperture 1270 is sealed by the third gasket seal 1460 and a gap 1170 is formed between the first aperture 1260 and the shaft

1410 such that fluid can freely pass therethrough. In the dispensing configuration, the first aperture 1260 is sealed by the second gasket seal 1450 and the second aperture 1270 is completely open such that fluid can freely pass therethrough. In the illustrated embodiment, the stopper element 1400 is configured to move vertically within the container 1100 when the user presses downward or pulls upward on the release knob 1435. The seals of the stopper element 1400 move between opening and sealing the apertures of the container 1100, including the upper opening 1130, the first aperture 1260, and the second aperture 1270.

In some embodiments, the shaft 1410 is spring biased towards the dispensing configuration via a telescopic or two-part concentric configuration. In this way, the first aperture 1260 is always closed until a user applies force to the release knob pushing the release knob towards the opposing side thereof. In other embodiments, the shaft 1410 is spring biased towards the measuring configuration. In this way, the second aperture 1270 is always closed until a user applies force to the release knob pulling the release knob towards the opposing side thereof.

In operation the first chamber 1200 of the container is filled with a fluid, such as bleach or another cleaning solvent. Additional fluid is received into the first chamber 1200 through the opening 1130 thereof. The stopper element 1400 initiates in the dispensing configuration, whereby the second chamber 1300 is empty and the opening 1130 and the first aperture 1260 in the internal divider 1250 is sealed. This prevents fluid 600 from passing through the first chamber 1200 into the second chamber 1300. In the initial dispensing configuration, the second chamber 1300 is void (empty) and the second aperture 1270 is exposed along the lower surface 1120 of the container 1100.

The volume of the second chamber 1300 is a known quantity, whereby the user knows the pre-determined volume and can utilize this known amount to dispense only that amount from the container 1100 in a single action or stroke of the stopper element 1400. In the illustrated embodiment, the stopper element 1400 is pressed downward, removing the second gasket seal 1450 from the first aperture 1260, such that the third gasket seal 1460 is moved to the second aperture 1270. In this way, the second aperture 1270 is sealed by the third gasket seal 1460 and the first aperture 1260 is opened to allow fluid to communicate from the first chamber 1200 of the container to the second chamber 1300. A space is formed between the internal divider 1250 and the second gasket seal 1450, thereby allowing the fluid to flow and into the second chamber 1300.

Once the stopper element 1400 has been moved into the measuring configuration as shown in FIG. 4, the fluid is allowed to equalize, whereby the fluid fills the entire interior volume of the second chamber 1300. This generally does not take any measurable time, as the gap between the internal divider 1250 and the lower surface 1120 is relatively small in relation to the overall height of the container 1100. In the illustrated embodiment, the fluid is not too viscous that the size of the gap 1260 would impede flow between the first chamber 1200 of the second chamber 1300. When the stopper element 1400 is moved downward, the second aperture 1270 is sealed and the fluid fills the second chamber 1300. Once this step is completed, the user can then dispense the fluid within the second chamber 1300 by lifting upwards on the release knob 1435. This in turn reverses the previous steps, opening the second aperture 1270, sealing the first aperture 1260 again, and consequently allowing fluid to flow from the second chamber 1300 to the exterior of the container 1100. The fluid flows through the second aperture 1270 and the fluid is dispensed from the lower surface 1120 of the container 1100. The movement of the stopper element 1400 is rapid to prevent additional fluid from moving into the second chamber 1300 from the first chamber 1200 when the third gasket seal 1460 is unseated from the second aperture 1270.

Figure 5:
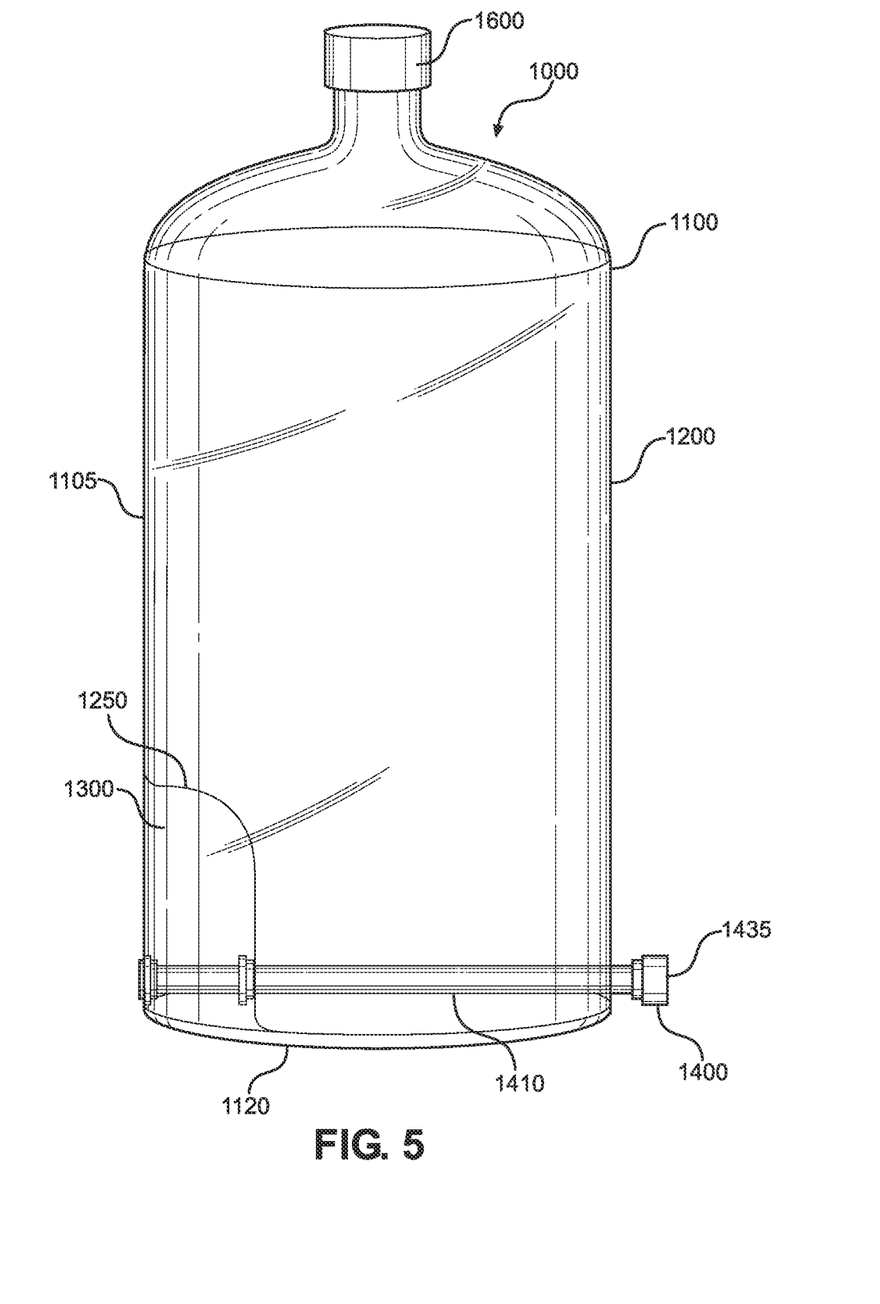
FIG. 5 shows a perspective view of a second embodiment of the fluid dispensing system, wherein the stopper element is in a measuring configuration.
Figure 6:
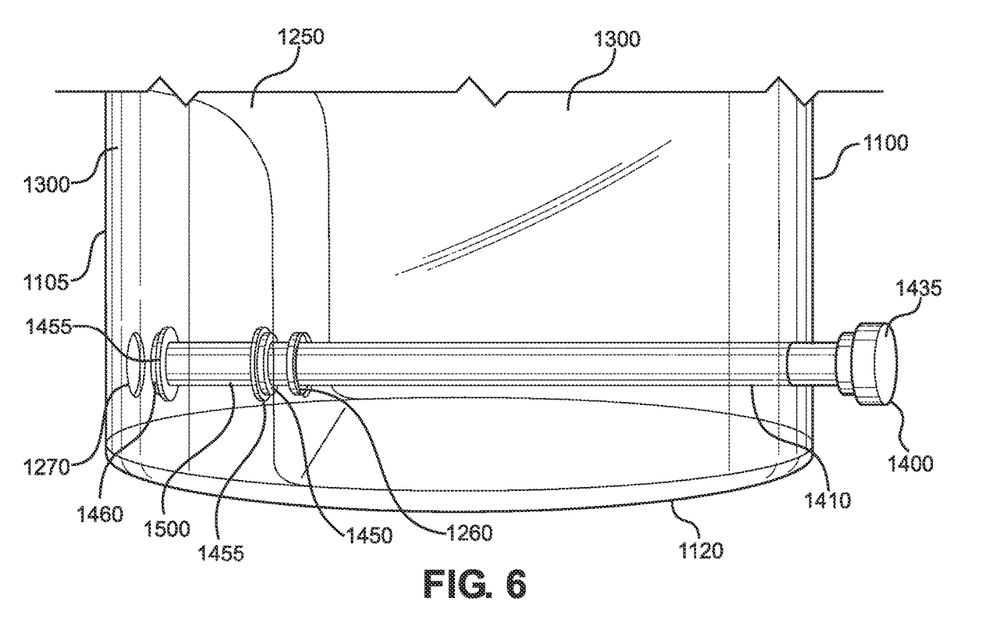
FIG. 6 shows a close-up view of the second chamber of a second embodiment of the fluid dispensing system, wherein the stopper element is in a dispensing configuration.

Referring now to FIGS. 5 and 6, there is a perspective view of a second embodiment of the fluid dispensing system and a close-up view of the second chamber and stopper element of a second embodiment of the fluid dispensing system. In an alternate embodiment, the second chamber 1300 is disposed along a side of the container 1100 such that the second chamber 1300 and a portion of the first chamber 1200 are side by side. In the illustrated embodiment, the internal divider 1250 extends from a sidewall 1105 of the container to the lower surface 1120 of the container 1100. The stopper element 1400 is disposed horizontally relative to the lower surface 1120 of the container 1100 and the mechanism of the stopper element 1400 in relation to the first aperture 1260 and the second aperture 1270 functions equivalently to the description provided above. The difference here being the orientation of the stopper element 1400 and the container elements relative to the user. In this way, the dispensing mechanism is accessible through the side of the container 100.

In the illustrated embodiment, a second shaft section 1500 extends between the second and third gasket seals 1450, 1460. The second shaft section 1500 provides more space between the gasket seals 1450, 1460 which in turn requires less lateral movement when transitioning between the measuring and dispensing configuration. Each gasket seal comprises a seat 1455 that prevents the gasket seals 1410 from passing through the first or second apertures. The seats 1455 are positioned between the respective gasket seal and the second shaft section 1500.

The opposing end of the stopper element 1400 extends through the opposing side of the container 1100, wherein the release knob 1435 is secured thereto and exterior to the container 1100. The shaft 1410 is movable through the opposing side of the container 1100. A sidewall seal is engaged between the shaft 1410 and the sidewall of container 1100 to prevent any fluid from passing therethrough. The sidewall seal is adapted to prevent fluid from escaping the first chamber 1200 when the stopper element 1400 moved between the measuring and dispensing configurations.

The container opening 1130 is configured to receive fluid is still disposed at an upper end of the first chamber 1200. However, the opening is not directly engaged with the stopper element 1400 and is removably covered by a cap 1600. The container 1100 permits a measured volume of fluid to be dispensed without pouring the volume into a secondary measuring container, and furthermore allows dispensing from the sidewall of the container 1100. In some embodiments, a spout extends from the second aperture 1270 exterior to the container 1100 for more convenient dispensing of the fluid when in the dispensing configuration.

Figure 7:
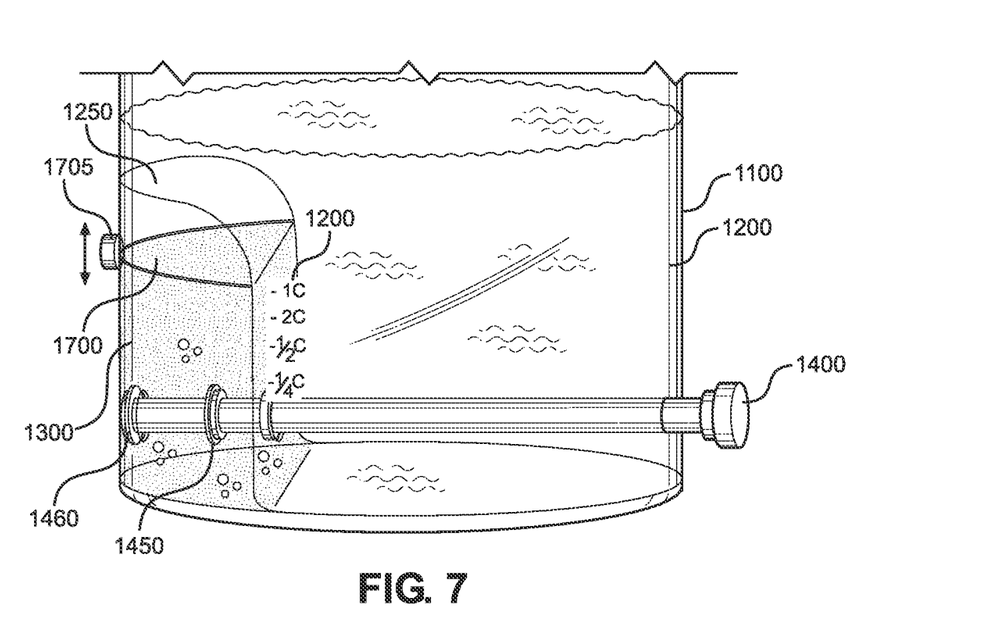
FIG. 7 shows a close-up view of the second chamber of a third embodiment of the fluid dispensing system.
Figure 8:
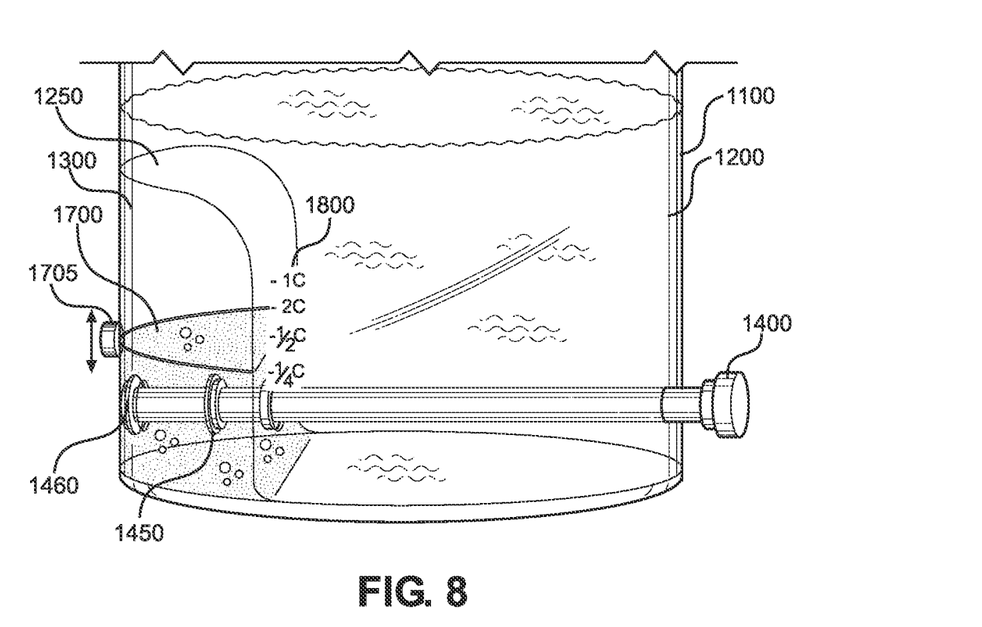
FIG. 8 shows another close-up view of the second chamber of a third embodiment of the fluid dispensing system.

Referring now to FIGS. 7 and 8, there are shown close-up views of the second chamber of a third embodiment of the fluid dispensing system. In the illustrated embodiment, the second chamber 1300 comprises a measuring plate 1700 configured to allow the fluid to fill the second chamber until the fluid abuts the plate 1700. The measuring plate 1700 is adapted to slide vertically within the second chamber 1200 and align with indicia 1800 marked on the container 1100 to provide for different fluid measurements to be dispensed. The measuring plate 1700 is planar and is sized to abut the container sidewalls and the vertical portion of the internal divider such that the perimeter of the plate is coextensive with container walls such that no fluid can pass from a lower side of the plate to an upper side thereof. A plate knob 1705 is operably connected to the measuring plate 1700 and extends from the exterior sidewall of the container 1100. The plate knob 1705 is adapted to be grasped by a user and slid vertically to adjust the amount of fluid allowed into the second chamber 1300. In some embodiments, a slot extends along the sidewall of the second chamber to allow a user to selectively slide the plate 1700. A valve or sealing mechanism is disposed between the slot and the plate knob 1705 to prevent fluid from passing through the slot as the plate 1700 is moved.

Figure 9:
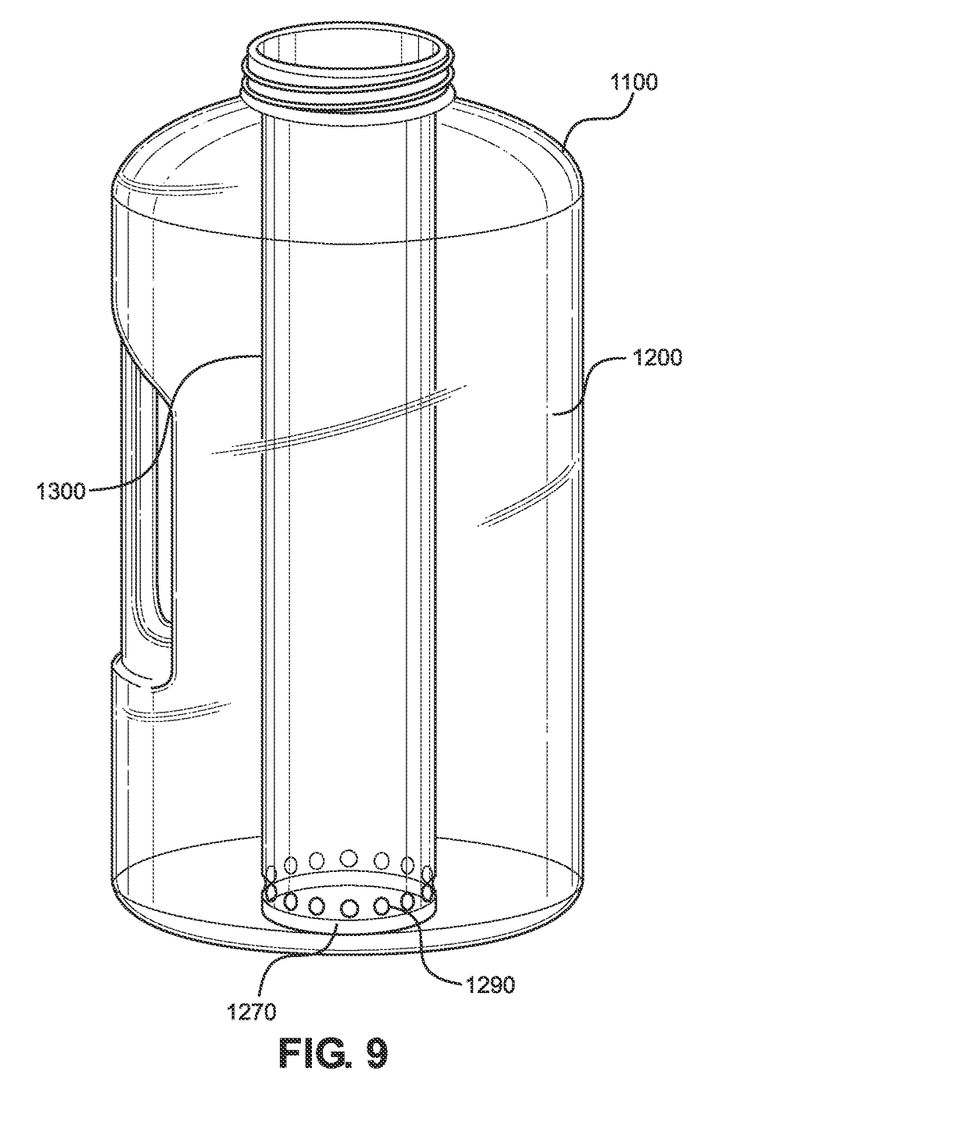
FIG. 9 shows a perspective view of the container of a fourth embodiment of the fluid dispensing system.
Figure 10:
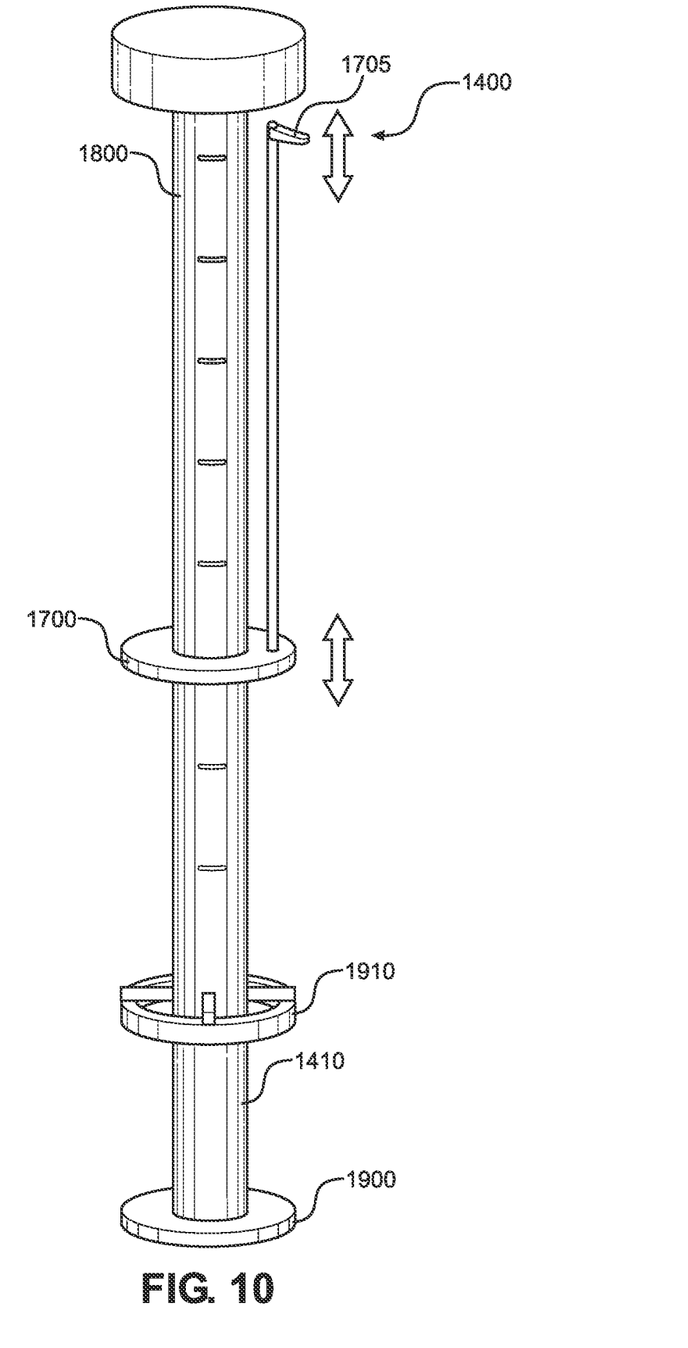
FIG. 10 shows a perspective view a stopper element of a fourth embodiment of the fluid dispensing system.

Referring now to FIGS. 9 and 10, there is shown a perspective view of the container and the stopper element of a fourth embodiment of the fluid dispensing system, respectively. In the illustrated embodiment, the second chamber 1300 of the container 1100 forms a barrel extending the entire length of the container. The second aperture 1270 is disposed at the lowermost end of the second chamber 1300. A plurality of holes 1290 are disposed at the lower end of the second chamber 1300 and allow fluid to flow from the first chamber 1200 into the second chamber 1300. In the illustrated embodiment, the holes extend continuously around the sidewall of the second chamber at a fixed distance. However, in alternate embodiments, it is contemplated that a single hole or aperture is disposed at the lower end of the second chamber to allow fluid to flow therethrough. The second aperture 1270 positioned beneath the plurality of holes 1290. In this embodiment, the second chamber does not share a same sidewall as the container.

The stopper element 1400 is movably positioned within the second chamber 1300 and serves as a plunger. The stopper element 1400 comprises a measuring plate 1700 that is movable along the shaft 1410 of the stopper element via a measuring guide 1705. The measuring plate 1700 prevents fluid from entering the interior volume of the second chamber 1300 thereabove or on the other side thereof. In the illustrated embodiment, the measuring plate is a solid disc that forms a seal between the perimeter thereof and the interior sidewall of the second chamber.

The measuring guide 1705 comprises a rigid element, such as a rod, that extends from the measuring plate 1700 at a first end. A second end of the measuring guide 1705 extends through an exterior of container 1100 so that it can be grasped and manipulated by a user. The measuring guide is movable between various indicia 1800 marked on the shaft of the stopper element. The indicia 1800 is indicative of volumetric measurements desired by the user to be dispensed from the second chamber 1300. The measuring guide 1705 is fixed to the measuring plate 1700.

Figure 13:
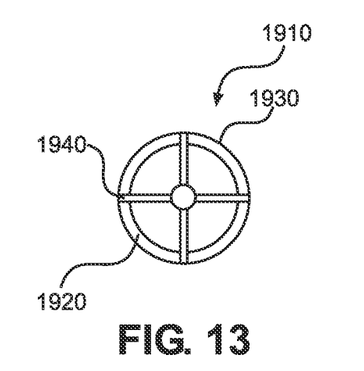
FIG. 13 shows a plan view of the first gasket seal of a fourth embodiment of the fluid dispensing system.
Figure 14:
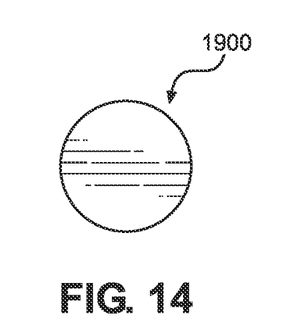
FIG. 14 shows a plan view of the second gasket seal of a fourth embodiment of the fluid dispensing system.

Referring now to FIGS. 10, 13, and 14, there is shown a stopper element of a fourth embodiment of the fluid dispensing system and plan views of the first gasket seal and second gasket seal of the stopper element, respectively. The second end of the stopper element comprises a plug configured to selectively and alternatively cover the second aperture 1270 and the plurality of holes 1290. In the illustrated embodiment, the plug comprises a first gasket seal 1910 and a second gasket seal 1900, wherein the first gasket seal 1910 removably covers the plurality of holes in the dispensing configuration and the second gasket seal 1900 removably covers the second aperture 1270 in the measuring configuration. The second gasket seal 1900 is a solid plug (as seen in FIG. 14) configured to prevent any fluid from passing through the second aperture 1270 in the measuring configuration. In the illustrated embodiment, the first gasket seal 1910 comprises apertures 1920 between fins 1940 that extend from the shaft 1410 to the outer perimeter of the first gasket seal 1910. In this way, fluid can flow through the apertures 1920 while the outer perimeter thereof seals the plurality of holes 1290 while in the dispensing configuration.

Figure 11:
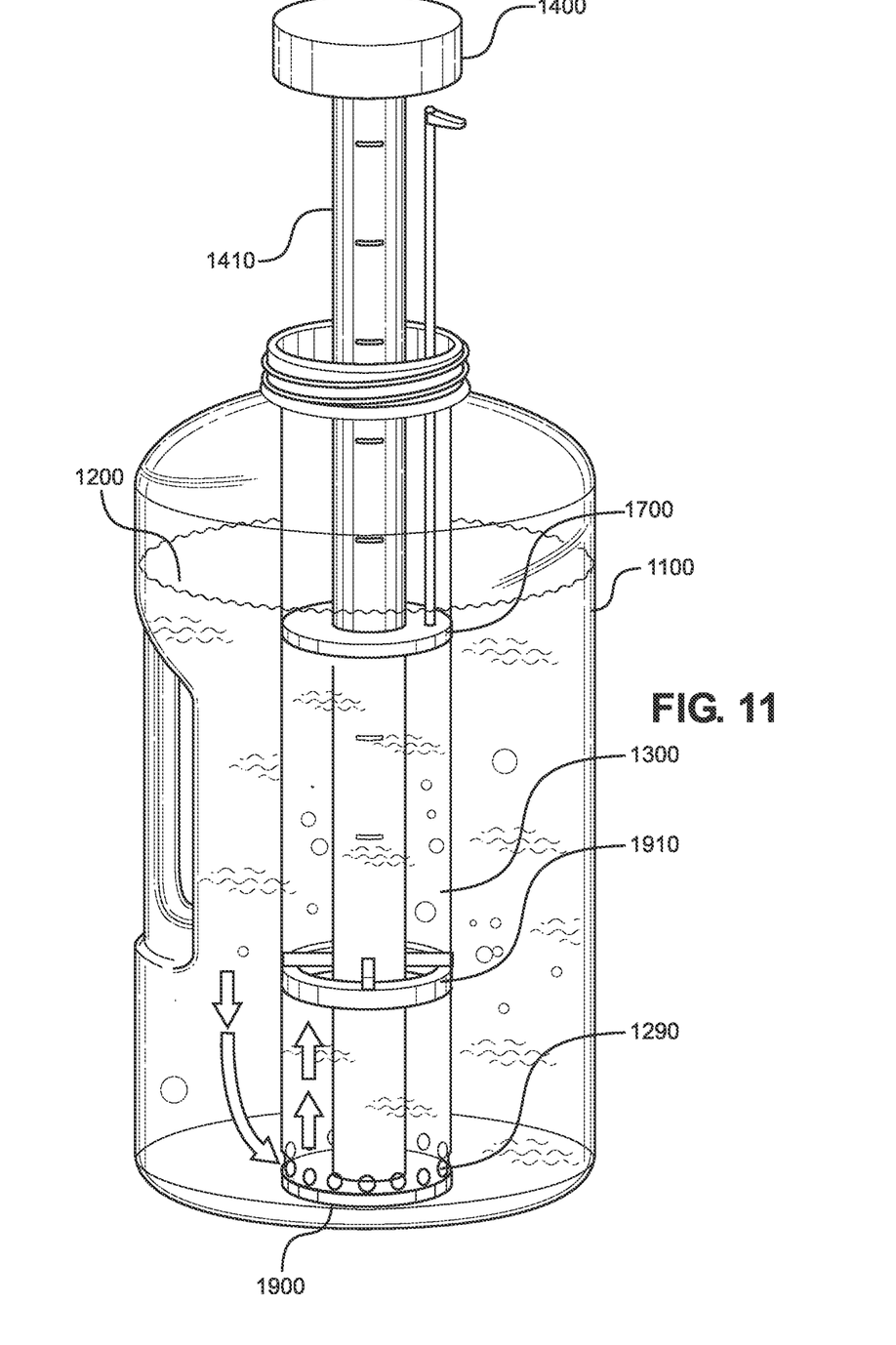
FIG. 11 shows a perspective view of a fourth embodiment of the fluid dispensing system, in a measuring configuration.
Figure 12:
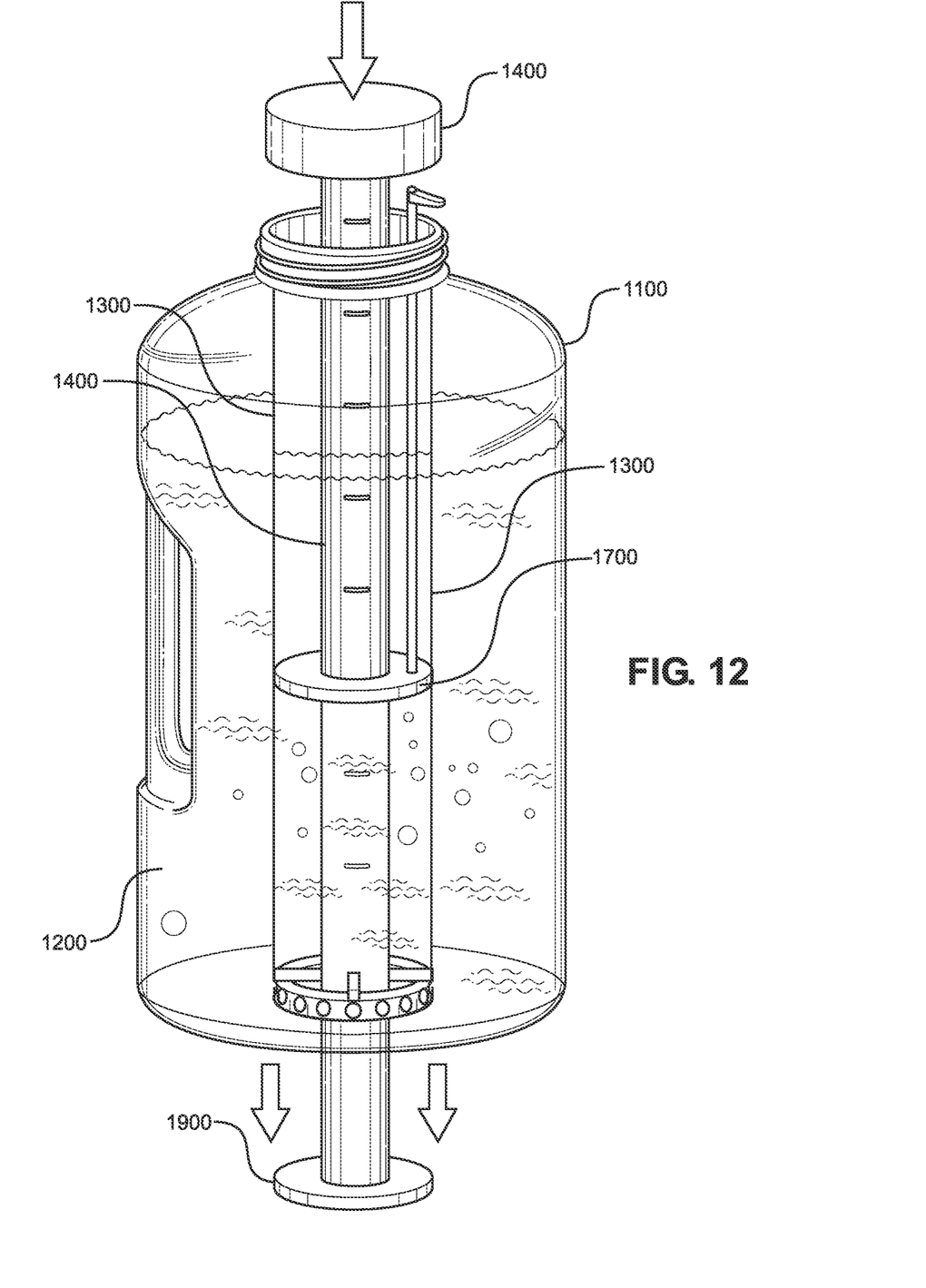
FIG. 12 shows a perspective view of a fourth embodiment of the fluid dispensing system, in a dispensing configuration.

Referring now to FIGS. 11 and 12, there is shown a perspective view of a fourth embodiment of the fluid dispensing system, in a measuring configuration and a dispensing configuration, respectively. In operation of the fourth embodiment, the stopper element 1400 is movable between the measuring and dispensing configurations. In the measuring configuration, the second gasket seal 1900 is disposed within the second aperture 1270 to prevent fluid from passing from the second chamber 1300 to the exterior of the container 1100. The plurality of holes are open and unblocked such that fluid flows from the first chamber into the second chamber therethrough. The fluid fills the second chamber, passing through the first gasket seal 1910, until the fluid reaches the measuring plate 1700. Once the fluid reaches the measuring plate, the fluid volume within the second chamber is equivalent to the volumetric measurement indicated on the indicia on which the measuring guide is positioned.

Figure 15:
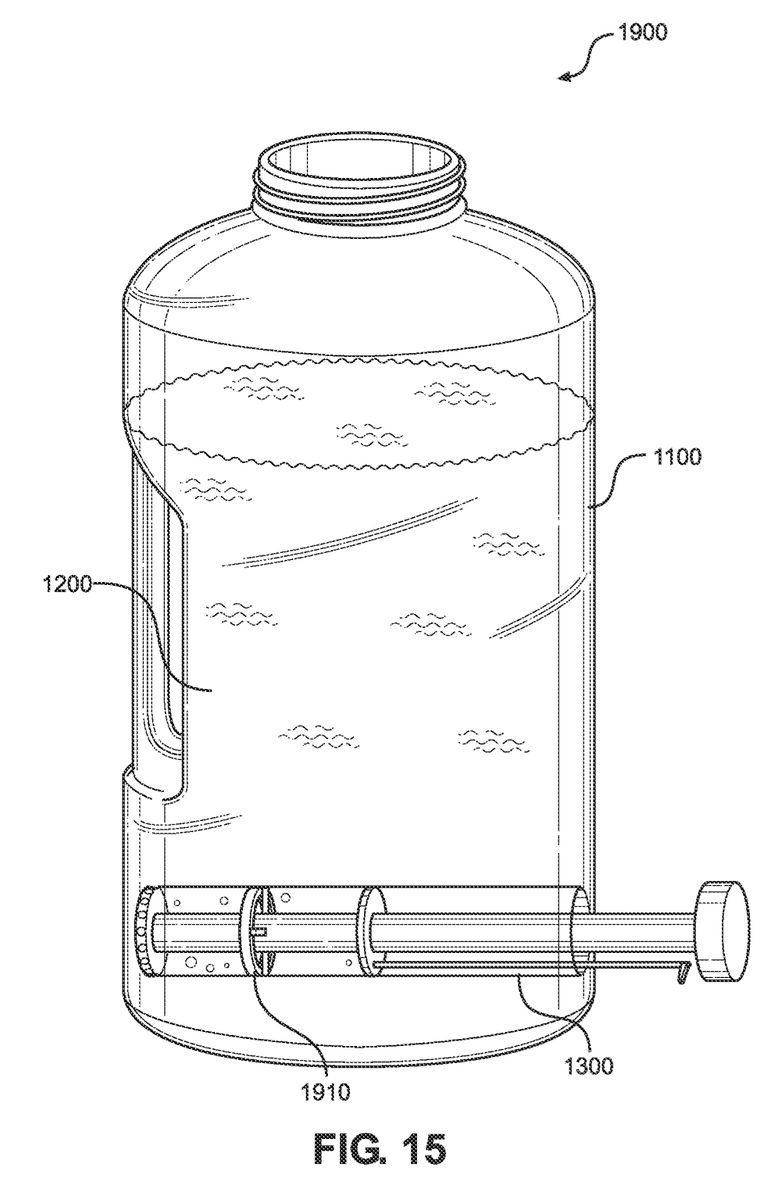
FIG. 15 shows a perspective view of a fifth embodiment of the fluid dispensing system.

When the user is ready to dispense the fluid from the second chamber 1300, the user presses downward on the knob of the stopper element thereby moving the entire stopper element and measuring guide downwards to the dispensing configuration. In the dispensing configuration, the second gasket seal 1900 is unseated from the second aperture 1270 and pushed exterior to the container 1100. In the illustrated embodiment, the second gasket seal 1900 does not move upward to pass through the second aperture and into the second chamber 1300. The second gasket seal only is seated within the second aperture or moved exterior to the container. The first gasket seal 1910 is moved to the plurality of holes such that the holes 1290 are sealed by the first gasket. This prevents fluid from passing from the first chamber into the second chamber while in the dispensing configuration. To move the stopper element back to the measuring configuration, the user pulls upward on the knob of the stopper element thereby sealing the second aperture with the second gasket seal and unsealing the plurality of holes 1290 to allow the second chamber to automatically refill to a desired volumetric measurement. In the illustrated embodiment, the stopper element is disposed along a vertical axis of the container. In alternate embodiments, such as seen in FIG. 15, the stopper element is positioned along the horizontal axis. In the illustrated fifth embodiment, the stopper element comprises all the same features as in the fourth embodiment. The container comprises the second aperture on the sidewall thereof and the second chamber is also disposed along a horizontal axis throughout the container. In the illustrated embodiment of FIG. 15, the release knob is moveable through an opening in the sidewall of the container, wherein fluid is prevented from passing through due to the seal formed by the measuring plate.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A fluid dispensing system, comprising:
    a container having a first chamber and a second chamber, wherein both the first chamber and the second chamber are configured to hold a fluid therein;
    an internal divider separating the first chamber from the second chamber;
    a first aperture disposed within the internal divider that allows the fluid to flow from the first chamber to the second chamber;
    a second aperture disposed in the second chamber that allows the fluid to dispense from the second chamber to an exterior of the container;
    a stopper element comprising a shaft having a release knob at a first end and a plug at a second end, wherein the release knob extends exterior to the container and is adapted to move the stopper element between a measuring configuration and a dispensing configuration;
    wherein the measuring configuration, the second aperture is sealed via the plug and unsealing the first aperture such that the fluid can freely pass from the first chamber to the second chamber;
    wherein the dispensing configuration, the first aperture is sealed via the plug and unsealing the second aperture such that the fluid can freely pass from the second chamber to the exterior of the container.

2. The fluid dispensing system of claim 1, wherein the internal divider is disposed along a horizontal plane that is parallel to a lowermost side of the container and the stopper element moves along a vertical axis of the container.

3. The fluid dispensing system of claim 2, wherein the first chamber is disposed above the second chamber is a stacked configuration.

4. The fluid dispensing system of claim 3, wherein a sidewall of the first chamber and the second chamber is continuous and coextensive with one another.

5. The fluid dispensing system of claim 1, wherein the internal divider is secured to a sidewall of the container and to a lowermost surface of the container, such that the second chamber is disposed on a side of the container.

6. The fluid dispensing system of claim 1, wherein the stopper element moves along a horizontal axis of the container.

7. The fluid dispensing system of claim 1, wherein the shaft comprises a smaller diameter than the plug, such that in the measuring configuration the shaft extends through the first aperture forming a gap from which the fluid passes through to the second chamber.

8. The fluid dispensing system of claim 1, wherein the first end of the stopper element comprises a release knob disposed exterior to the container and configured to linearly move the shaft.

9. The fluid dispensing system of claim 1, wherein the first end of the stopper element comprises a first gasket seal and a first seat adapted to seal an upper opening of the container, wherein the fluid received through the upper opening is received directly into the first chamber.

10. The fluid dispensing system of claim 9, wherein the stopper element comprises a first shaft section disposed between the first gasket seal and the release knob, wherein the first shaft section is telescopic such that the release knob is configured to secure to a mouth of the container while the upper opening remains sealed by the first gasket seal.

11. The fluid dispensing system of claim 1, wherein the second end of the stopper element comprises a second gasket seal, a third gasket seal, and a seat therebetween wherein the second gasket seal is configured to seal the first aperture, the third gasket seal is configured to seal the second aperture, and the seat is configured to prevent the second and third gasket seals from passing through the first and second aperture.

12. The fluid dispensing system of claim 11, wherein a second shaft section extends between the second gasket seal and the third gasket seal.

13. The fluid dispensing system of claim 11, wherein the third gasket seal forms a lower most end of the stopper element.

14. The fluid dispensing system of claim 1, wherein the second chamber comprises a smaller interior volume than the first chamber and the smaller interior volume comprises a predetermined volume measurement.

15. The fluid dispensing system of claim 1, further comprising a measuring plate disposed within the second chamber and operably connected to a plate knob extending from a sidewall of the container, wherein the measuring plate is movable via the plate knob and configured to prevent the fluid from passing from a first end of the second chamber to a second end of the second chamber.

16. The fluid dispensing system of claim 15, further comprising indicia on the container indicating a volumetric measurement, wherein the measuring plate is adapted to align therewith.

17. The fluid dispensing system of claim 1, wherein the first and second aperture are in vertical alignment with the vertical axis.

18. A fluid dispensing system, comprising:
    a container having a first chamber and a second chamber, wherein both the first chamber and the second chamber are configured to hold a fluid therein;
    a plurality of holes is disposed within a lower end of the second chamber that allows the fluid to flow from the first chamber to the second chamber;
    a second aperture disposed in the second chamber that allows the fluid to dispense from the second chamber to an exterior of the container;
    a stopper element comprising a shaft having a release knob at a first end and a plug at a second end, wherein the release knob extends exterior to the container and is adapted to move the stopper element between a measuring configuration and a dispensing configuration;
    wherein the measuring configuration the second aperture is sealed by the plug and the plurality of holes is unsealed;
    wherein the dispensing configuration the second aperture is unsealed to allow the fluid to flow from the second chamber to the exterior of the container and the plurality of holes are sealed by the plug.

19. The fluid dispensing system of claim 18, further comprising:
    a measuring plate disposed around the shaft of the stopper element and configured to prevent the fluid from flowing to an opposing side of the measuring plate;

a measuring guide secured to the measuring plate, wherein the measuring guide is configured to slide the measuring plate along the shaft to adjust a volume of the fluid that can be received within the second chamber in the measuring configuration.

20. The fluid dispensing system of claim 18, wherein the second chamber extends between opposing sides of the container.

* * * * *